United States Patent [19]
Anderson

[11] 3,876,808
[45] Apr. 8, 1975

[54] PREPARATION OF A BALANCED MIXED VIABLE BACTERIAL CULTURE

[75] Inventor: Leo Anderson, Saltsjobaden, Sweden

[73] Assignee: Wenner-Gren Medical Laboratory AB, Stockholm, Sweden

[22] Filed: June 11, 1973

[21] Appl. No.: 369,064

[30] Foreign Application Priority Data
June 16, 1972 Sweden.............................. 7982/72

[52] U.S. Cl. ..................... 426/61; 195/59; 195/96; 195/100; 195/111; 195/114; 426/34; 426/43
[51] Int. Cl............................ A23c 9/12; C12k 1/00
[58] Field of Search ............ 426/34, 43, 61; 195/59, 195/96, 100, 111, 114

[56] References Cited
UNITED STATES PATENTS
3,320,130   5/1967   Henry ............................... 426/43 X
3,420,742   1/1969   Farr ..................................... 426/61

OTHER PUBLICATIONS

Webb et. al., Byproducts from Milk, 2nd Ed., The Avi Publ. Co., Inc., 1970, (pp. 26-29 & 37-39) SF239W58.

Primary Examiner—David M. Naff
Attorney, Agent, or Firm—Strauch, Nolan, Neale, Nies & Kurz

[57] ABSTRACT

A dry mixed culture containing Lactobacillus bulgaricus and Streptococcus thermophilus in the ratio of 40:60 to 60:40 percent is produced by using for cultivation a skimmilk substrate containing cyanocobalamine, or cyanocobalamine and lysin and/or cystin, and drying after cultivation.

4 Claims, No Drawings

PREPARATION OF A BALANCED MIXED VIABLE BACTERIAL CULTURE

The invention relates to a process for the production of a balanced, viable, and living culture of Lactobacillus bulgaricus and Streptococcus thermophilus in a ratio of 40:60% to 60:40% in dried condition in skim milk powder.

Various methods for producing yoghurt cultures have been known for a long time, and it is also known to use such cultures as additives to animal feed.

In contradistinction to what is aforeknown the present invention is characterized substantially by adding cyanocobalamine, and suitably also lysin and/or cystin, to the nutrient substrate before starting the cultivation. The cultivation is carried out in condensed skim milk having a dry substance content of about 18 to 24%. The various additives are proportioned: 0.5 to 5 mg cyanocobalamine, 50 to 500 g lysin, and 10 to 1000 g cystin, all counted on 100 l skim milk. A favourable result is dependent most of all on the amount of cyanocobalamine but in this respect also the relatively high cost of said substance must be considered.

The addition of the above substances also has the advantage that the subsequent drying of the nutrient substrate can take place at a higher temperature, namely between 70° and 85°C, preferably between 75° and 80°C, compared with the conventional drying temperature of about 60° to 65°C.

EXAMPLE

To 100 l condensed skim milk having a dry substance content of 21% there were added 250 g lysin, 100 g cystin and 1.6 mg cyanocobalamine, and the bacteria were then cultivated for 5½ hours at about 45°C. Subsequently, the skim milk substrate was cooled and spray-dried at a temperature of 75°C.

Starting from this example several cultivation tests were made with or without the above additives, and the substrate was dried at 70° and 80°C. The results are compiled in the table below.

Drying at 70 and 80°C of mixed cultures of *Lactobacillu bulgaricus* and *Streptococcus thermophilus* cultivated on skim milk with and without additives

| Additives | Drying at 70°C | | Drying at 80°C | |
|---|---|---|---|---|
| | Acidity Thörner | Bacterial balance Coccus-rods | Acidity Thörner | Bacterial balance Coccus-rods |
| none | 86° | 90:10 | 87° | 100:0 |
| lysin | 146° | 65:35 | 69° | 100:0 |
| cystin | 145° | 50:50 | 76° | 99:1 |
| cyanocobalamine | 145° | 55:45 | 147° | 50:50 |
| all additives | 145° | 50:50 | 150° | 50:50 |

This table shows that the various additives shift the bacterial balance coccus-rods towards an equal distribution in the dried skim milk powder which result is still more evident if the higher drying temperature of 80°C is used.

What I claim is:

1. A process for producing a dry composition comprising skim milk and a balanced, viable, and living culture of Lactobacillus bulgaricus and Streptococcus thermophilus, said method comprising the steps of: providing a condensed skim milk nutrient substrate having a solids content of from 18 to 24 percent; adding cyanocobalamine to said nutrient substrate in the amount of from 0.5 to 5 milligrams per 100 liters of nutrient substrate; cultivating the bacteria on said substrate until Lactobacillus bulgaricus and Streptococcus thermophilus are obtained in a ratio of from 40:60 to 60:40 percent; and drying the nutrient substrate and the bacteria cultivated thereon.

2. The process of claim 1, together with the step of adding to the nutrient substrate before the bacteria are cultivated thereon, one or both of the following: from 50 to 500 grams of lysin and from 10 to 1000 grams of cystin per 100 liters of nutrient substrate.

3. The process of claim 1, wherein the nutrient substrate and the bacteria cultivated thereon are dried at a temperature of from 70° to 85°C.

4. The process of claim 3, wherein the temperature is from 75° to 80°C.

* * * * *